United States Patent [19]

Winstead

[11] 4,115,273

[45] Sep. 19, 1978

[54] WAVE PATTERNED SUPPORT FOR DIALYZER MEMBRANE

[75] Inventor: Thomas W. Winstead, Baltimore, Md.

[73] Assignee: Extracorporeal Medical Specialties, Inc., King of Prussia, Pa.

[21] Appl. No.: 742,359

[22] Filed: Nov. 15, 1976

[51] Int. Cl.² .......................................... B01D 31/00
[52] U.S. Cl. ........................... 210/321 A; 210/321 B; 210/494 M; 210/497.1
[58] Field of Search ........... 210/321 R, 321 B, 321 A, 210/494 M, 497.1

[56] References Cited

U.S. PATENT DOCUMENTS

| | | | |
|---|---|---|---|
| 3,738,813 | 6/1973 | Esmond | 210/321 B |
| 3,960,730 | 6/1976 | Miller | 210/321 B |

*Primary Examiner*—Frank A. Spear, Jr.
*Assistant Examiner*—E. Rollins Cross
*Attorney, Agent, or Firm*—Connolly and Hutz

[57] ABSTRACT

An extracorporeal, disposable, dialyzer for use in a variety of artificial kidney or other mass transfer systems, which includes a sheet of plastic material supporting a flattened tube of membrane material, the sheet of support material consists of a continuous sheet of contoured, substantially uniform thickness material including a series of spaced apart hollow protrusions extending outwardly from each side thereof, the summits of the hollow protrusions defining membrane support surfaces on each side of the sheet, and the summits being arranged with respect to each other in predetermined wave patterns dimensioned and arranged such that, when an elongated length of the sheet is formed into a roll having predetermined inner and outer peripheral dimensions, the wave patterns will never be directly superimposed thereby avoiding the tendency of corresponding hollow protrusions to interdigitate and occlude the fluid flow passages.

10 Claims, 6 Drawing Figures

WAVE PATTERNED SUPPORT FOR DIALYZER MEMBRANE

BACKGROUND OF THE INVENTION

This invention relates to mass transfer devices in which different fluids are exposed to opposite sides of a semi-permeable membrane so that one or more components of one fluid will pass through the membrane to the other fluid, and more particularly to unique and highly effective material for supporting the flexible membrane material in blood dialyzers for use as artificial kidneys.

Prior to the present invention, a great variety of suggestions have been published for supporting the usually thin and flexible membrane in mass transfer devices, and particularly in dialyzer devices, some of which have been exploited commercially and some of which have not. The present invention will be described primarily in terms of a dialyzer coil for use as an artificial kidney, although it is to be understood that the invention is not limited to the same because the support material of this invention is useful in flat plate and other types of blood dialyzers as well as other types of mass transfer devices.

Dialyzer coil designs which have been exploited commercially utilize mesh or netting material made up of intersecting strands as a support for the flattened tubular membranes. Early coils such as those disclosed in Metz U.S. Pat. No. 2,880,501 issued Apr. 7, 1959, and Broman U.S. Pat. No. 2,969,150 issued Jan. 24, 1961, utilize an over-and-under woven type of mesh material. A significant improvement in commercial dialyzer coil design was brought about by the use of a particular non-woven plastic netting disclosed by Dr. Theodor Kolobow in "A New Dynamic Disposable Artificial Kidney," Transactions, American Society For Artificial Internal Organs, Volume X, pages 116-120 (1964), and Proceedings, Conference on Hemodialysis, (Nov. 9-10, 1964) National Institute of Health, Bethesda, Md., pages 87-94. The same non-woven plastic netting is disclosed as being useful in a multiple-start-spiral design of dialyzer coil in Hoeltzenbein U.S. Pat. No. Re. 27,510 issued Oct. 24, 1972, an improved orientation for the non-woven strands of such netting is disclosed in Miller U.S. Pat. No. 3,508,662 granted Apr. 28, 1970, and a particular cross-sectional shape for such strands is disclosed in Martinez U.S. Pat. No. 3,709,367 issued Jan. 9, 1973.

Membrane support material which does not make use of intersecting strands arranged in the form of a mesh or netting has also been proposed, and used to some extent commercially, although it is believed that such material has not met with any significant commercial success to date in disposable type dialyzers, particularly the popular coil types. Gobel and Bluemle U.S. Pat. No. 3,077,268 granted Feb. 12, 1963, discloses a dialyzer coil utilizing a support material comprising radially impervious plastic sheet having "hobnail" embossments protruding from the opposite sides thereof. To avoid interdigitation of the peaks of the hobnail protrusions which would substantially occlude the blood passage, Gobel and Bluemle provide a series of large protrusions and a thickened separator rim having a longitudinal groove on one side and cooperating disc-shaped projections on the other side to prevent axial shifting of adjacent turns or wraps of the coil. Bluemle U.S. Pat. No. 3,362,540 issued Jan. 9, 1968, discloses a membrane support for a flat plate type of dialyzer which also has embossments protruding from each side of a central sheet, but in this device interdigitation of the opposed protrusions which would substantially occlude the blood passage is avoided as a problem during operation by the use of spacers at the edges of the device. In the coil and flat plate devices disclosed in these patents, the embossments always are arranged in identical geometrical patterns so that the embossments on one side of the blood passage are spaced apart exactly the same along any given directional line as the directly opposed embossments on the other side of the blood passage, and this creates the unacceptable possibility that the opposed embossments can interdigitate and substantially occlude the blood passage, and also the passage for dialysate, unless the special spacing features are provided.

The foregoing problems were solved by the invention described and claimed in Miller U.S. Pat. No. 3,960,730 granted June 1, 1976, by the provision of a membrane support, which does not make use of intersecting strands arranged in the form of either a woven mesh or a non-woven netting, which consists of a sheet of embossed plastic including a large number of protruding embossments on each side arranged in geometrical patterns which are different on opposite sides of the blood passage so that the summits of the embossments on one side of the blood passage are spaced apart differently along any given directional line than the directly opposed summits of the embossments on the other side, so as positively to avoid interdigitation of the summits to an extent which would substantially and undesirably occlude the blood passage.

The embossed membrane support material disclosed in the aforesaid Miller U.S. Pat. No. 3,960,730 has embossments which protrude from each side of the material, as noted, making it possible to angularly offset or otherwise displace or orient the embossed pattern on one side of the sheet with respect to the embossed pattern on the other side. This "double-sided" type of material has disadvantages, however, when compared with substantially uniform thickness material in which each hollow protrusion on one side of the material represents a valley recess on the other side of the material.

Single or uniform thickness material, for instance, has many production advantages over double-sided material. The weight per unit size of uniform thickness material is lower than double-sided embossed material, so that a greater length of single thickness material is included in, say, a 50 pound roll than is the case with double-sided embossed material, which significantly reduces shipping and handling costs. By the same token, the actual amount of plastic membrane support material used in each artificial kidney dialyzer device is less by a small but measurable percentage, similarly reducing cost and weight.

The cost of manufacturing uniform thickness material similarly has advantages over the cost of manufacturing double-sided material. For instance, the manufacture of single thickness material starts with a significantly thinner, oriented sheet of plastic, and the forming of the sheet can be accomplished at a considerably faster rate because there is less deformation required. The longer cooling times which are necessary with the thicker embossments of the double-sided material can be avoided, and there is an absence of thick sections immediately adjacent thin sections which impose constraints on the speed of forming double-sided material.

These and other advantages of using uniform thickness material dictate its desirability for use as a membrane support, but the heretofore unresolved problem is that uniform thickness material, by the very nature of its design, requires that the patterns in which the embossments are arranged must be virtually identical on both sides. This inherent and unavoidable limitation precludes the possibility of having the embossment pattern on one side angularly offset or otherwise displaced with respect to the embossment pattern on the other side of the sheet as taught in the aforesaid Miller U.S. Pat. No. 3,960,730.

Uniform thickness material nevertheless has been proposed for use as a separator in mass transfer devices. Such material is shown in Esmond U.S. Pat. No. 3,738,813 issued June 12, 1973, which discloses a mass transfer device in which the plain gas transfer film 13 is rolled up as a single layer with the embossed support material 15, so that oxygen flows in the space provided between the outer face of the film 13 and the inner face of the layer 15 between its embossments, and blood flows in the space provided between the inner face of the film 13 and the outer face of the layer 15 between its embossments. Since the embossments as formed by the opposed rollers 23, 26 protrude alternately from opposite faces of the sheet 15, however, they of course are in regular patterns such that interdigitation in both axial and circumferential planes is virtually inevitable. Esmond does not suggest that the embossments can be constructed and arranged in predetermined patterns to avoid interdigitation.

Esmond U.S. Pat. No. 3,490,523 issued Jan. 20, 1970, discloses a transfer device which includes a centrally disposed envelope having secured to opposite sides thereof a pair of flow sheets, each flow sheet having a plurality of longitudinal channels of sine-cosine configuration with the opposed curves 180° out of phase defining channels which cross one another at regular intervals and prevent relative collapse. Although suggesting the use of wave patterns to avoid interdigitation, this Esmond patent neither discloses nor suggests that wave patterns can be so dimensioned and arranged as to preclude interdigitation when an elongated length of uniform thickness membrane support sheet is formed into a roll as required in a coil type dialyzer.

SUMMARY OF THE INVENTION

This invention provides an inexpensive, disposable mass transfer device, such as a dialyzer coil for use in artificial kidney machines, wherein the support material consists of a continuous sheet of contoured, substantially uniform thickness material sufficiently rigid to provide spaced apart generally parallel membrane support surfaces, one on each side of the sheet, the support surface on one side being defined by a series of spaced apart summits of hollow protrusions extending outwardly toward the one support surface and the support surface on the other side being defined by another series of spaced apart summits of hollow protrusions extending outwardly toward the other support surface, the spacing apart between the summits which define the support surface on one side being sufficiently small with respect to the space between the two support surfaces to insure that under operating pressures the membrane contacts only the summits and does not flex inwardly between the summits toward the support surface on the other side to the extent that passage for the other fluid becomes occluded, the summits which define the support surface on one side of the sheet being arranged with respect to each other, and also with respect to the summits which define the support surface on the other side of the sheet, in a predetermined regular wave pattern dimensioned and arranged such that, when an elongated length of the sheet is formed into a roll having predetermined inner and outer peripheral dimensions, the pattern will never be directly superimposed upon itself thereby avoiding the tendency of corresponding hollow protrusions to interdigitate.

BRIEF DESCRIPTION OF THE DRAWINGS

Numerous advantages of the present invention will become apparent to one skilled in the art from a reading of the detailed description in conjunction with the accompanying drawings, wherein similar reference characters refer to similar parts, and in which.

DETAILED DESCRIPTION

Figure 6:
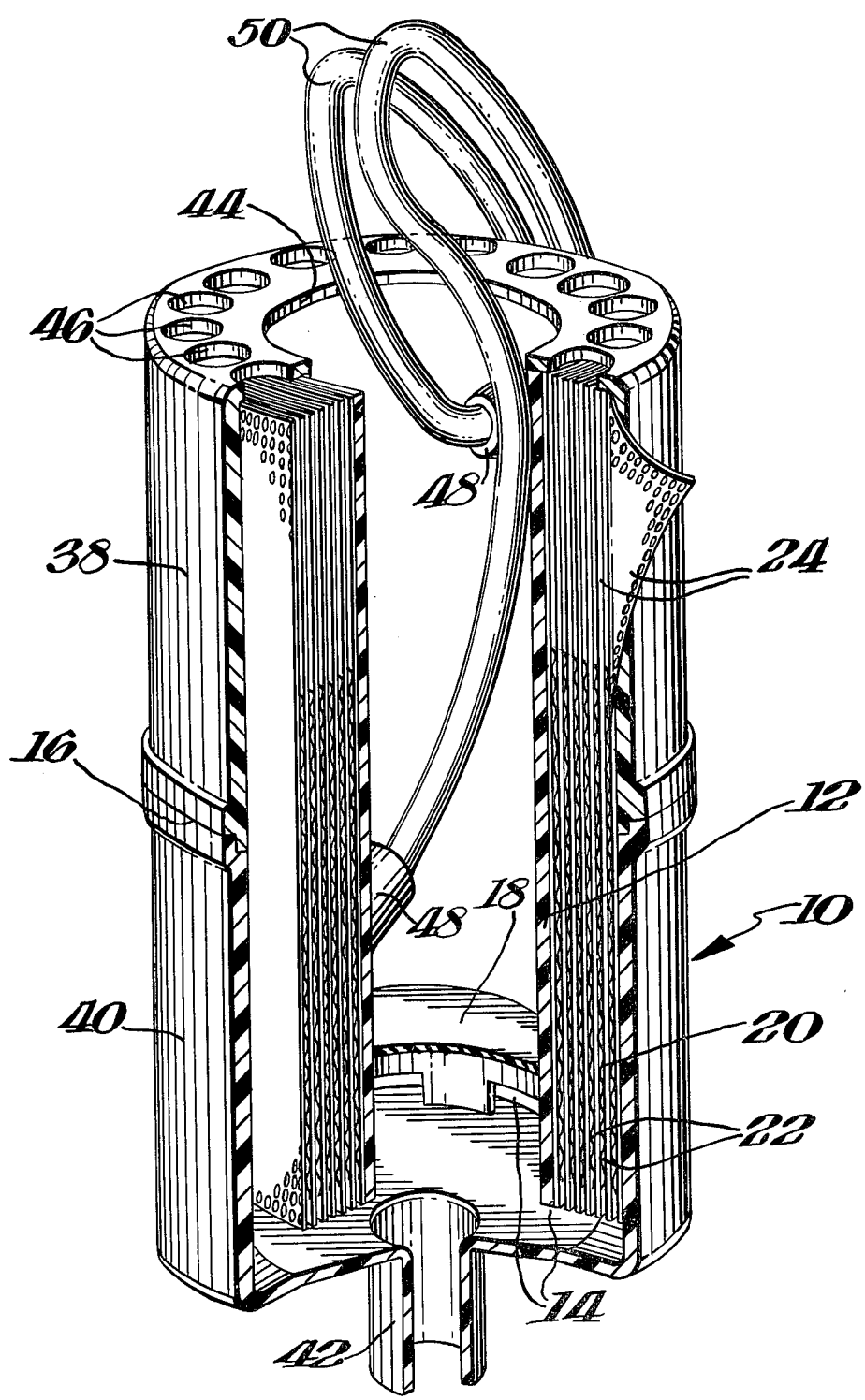

Referring in more particularity to the drawings, FIG. 6 shows one exemplary form of mass transfer device with which the embossed material for supporting permeable membrane according to this invention is useful. This comprises a coil type dialyzer unit 10 for use in artificial kidney machines.

The dialyzer unit 10 includes a generally cylindrical inner core member 12 made of rigid plastic material having dialysate inflow castellations 14 spaced around its lower end, and a lateral internal baffle wall 18 to prevent dialysate from flowing upwardly through the interior of the core 12 and to direct the dialysate to flow outwardly through the inflow castellations 14 to the dialyzing portion of the unit.

The dialyzing portion 20 of the unit 10 consists of membrane 22 and support material 24 rolled up together around the inner core member 12 in the general manner described in Miller U.S. Pat. No. 3,508,662. The membrane 22 takes the form of an elongated flattened tube, one side providing a first section 26 of membrane and the other side providing a second section 28 of membrane positioned in close opposition to each other to provide between their inner surfaces a passage 30 which accommodates blood in smooth flow. The passage for the blood is relatively long and spirally directed outwardly, and essentially linear in cross-section. The support material 24 according to this invention, which is described in greater detail below, consists essentially of a single sheet of plastic material including embossments which provide a first support surface 32 and a second support surface 34 for positioning adjacent the membrane to provide passage 36 which accommodates dialysate in turbulent flow against the outer surfaces of the sections of membrane. The passage for the dialysate is relatively short and axially directed upwardly, and spiral in cross-section.

A rigid outer casing enclosing the unit consists essentially of an upper end cap 38 and a lower end cap 40 having cupshaped configurations and being joined as at 16 at their rims. The base postion of the lower end cap 40 has a downwardly extending central tapered connector 42 adapted for engagement with a dialysate inflow opening of an artificial kidney machine to position the dialyzer coil unit thereon, and to provide for flow of dialysate into the unit. The base portion of the upper end cap 38 has a large central aperture 44 to provide access for blood tubing and a series of smaller apertures 46 located therearound to provide for flow of dialysate out of the dialyzer. The rigid outer casing is disclosed in greater detail in Miller U.S. Pat. No. 3,853,769 granted Dec. 10, 1974.

Means including adapters 48 are provided for connecting each end of the spiral blood passage 30 with tubing 50 for communication with the circulatory system of a patient (not shown). Similarly, the above described means for connecting each end of the axial passage 36 for dialysate with the dialysis system of an artificial kidney machine (not shown) are of the type which are useful with a fully recirculating dialysate system or one in which a recirculating system is used in combination with fresh dialysate addition. This invention is not confined, however, to such devices, because it also finds utility as a totally enclosed artificial kidney unit for use in a single pass system or "recirculating single pass" system utilizing negative dialysate pressure for fluid removal. The support material described in greater detail below is also expected to have utility in a wide variety of artificial kidney designs, including single layer and multiple layer types arranged in flat plate, stacked or coiled configurations, as well as other mass transfer devices including artificial lungs, artificial placentas, water purification devices, and the like. Thus, the foregoing disclosure of the preferred embodiment of the invention should not be interpreted as limiting the environment in which the invention may prove beneficial.

Referring with more particularity to FIGS. 1-5, the support material 24 consists of a continuous sheet of contoured material, which is of substantially uniform thickness in the sense that a protrusion fron one side of the material represents a corresponding valley or recess into the other side of the material. The material may be any non-toxic plastic or other material which is sufficiently flexible at normal room temperature that it may be rolled into a cylindrical coil, and is sufficiently rigid at human body temperature that it will provide spaced apart generally parallel membrane support surfaces 32 and 34, one on each side of the sheet 24. The first support surface 32 on one side of the sheet is defined by a series of spaced apart summits 52 of hollow protrusions 54 which extend outwardly toward the one support surface 32. The second support surface 34 on the other side is defined by another series of spaced apart summits 56 of hollow protrusions 58 extending outwardly toward the other support surface 34. The spacing apart 52a between the summits 52 which define the support surface 32 on one side of the sheet 24 is sufficiently small with respect to the space 33 between the two support surfaces 32, 34 to insure that under operating pressures the membrane contacts only the summits and does not flex inwardly between the summits toward the support surface 34 on the other side to the extent that passage 36 for the dialysate fluid becomes occluded.

The summits 52 which define the support surface 32 on one side of the sheet 24 are arranged with respect to each other, and also with respect to the summits 56 which define the support surface 34 on the other side of the sheet, in a predetermined pattern dimensioned and arranged such that, when an elongated length of the sheet 24 is formed into a roll as at 20 having a predetermined inner peripheral dimension and a predetermined outer peripheral dimension, the pattern will never be directly superimposed upon itself thereby avoiding the tendency of corresponding hollow protrusions 54, 58 to interdigitate.

Figure 1:
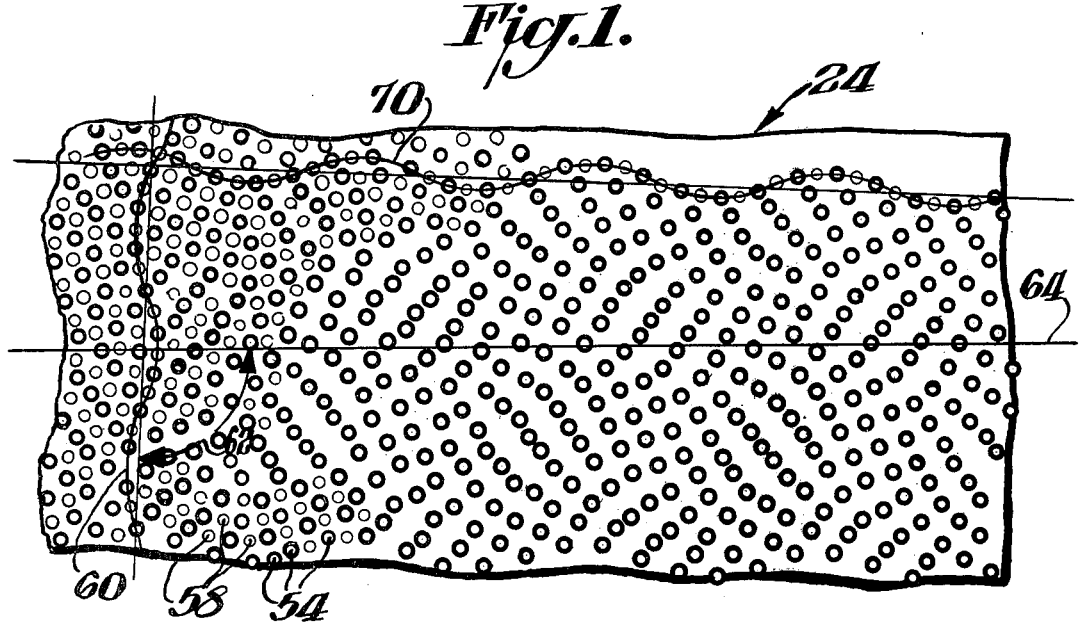
FIG. 1 is an enlarged view of a fragment of the uniform thickness membrane support material according to this invention showing useful wave patterns of the embossments.
Figure 2:
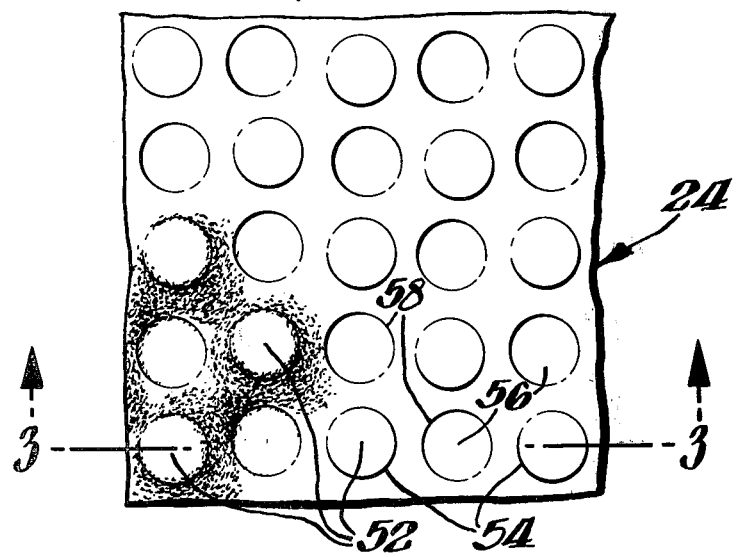
FIG. 2 is a greatly enlarged plan view of a fragment of the support material according to this invention showing the construction of the embossments in greater detail.
Figure 3:
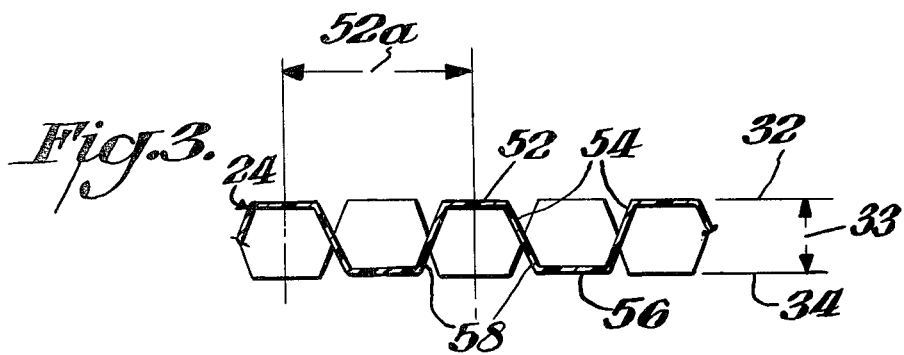
FIG. 3 is a sectional view on line 3—3 of FIG. 2.
Figure 4:
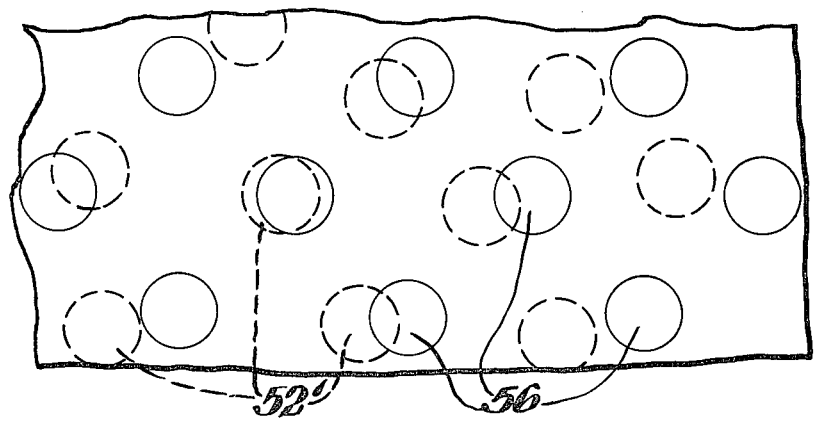
FIG. 4 is a greatly enlarged stylized view showing how the opposed embossments of adjacent layers of the support material are arranged with respect to each other.

The predetermined pattern in which the summits of the hollow protrusions are arranged to avoid the tendency of corresponding hollow protrusions to interdigitate when the sheet is formed into a roll may take many forms. The presently preferred mode involves the use of regular wave patterns, some useful embodiments of which are illustrated in FIG. 1. In that figure, the hollow protrusions 54 which are directed outwardly toward the near side of the sheet 24 are represented by heavy circles, and the hollow protrusions 58 which extend outwardly toward the far side of the sheet have their corresponding valleys represented by light circles. The convex hollow protrusions 54 are arranged with respect to each other, and also with respect to the concave hollow protrusions 58, in a predetermined regular wave pattern, which in the illustrated embodiment involves both a series of continuous undulating transverse waves and a series of continuous undulating longitudinal waves, although as explained below it is not a requirement of this invention that the support material make use of both transverse and longitudinal wave patterns.

As illustrated in FIG. 1, the predetermined regular wave pattern includes oppositely directed hollow protrusions arranged in a series of continuous undulating transverse waves, as indicated by the wave line 60, which have axes generally transverse to the direction of roll-up 64 of the elongated sheet, and the axes of the transverse waves 60 are angled (that is, not exactly perpendicular) to the direction of roll-up, as indicated at 62. The angle 62 and the wave length of the waves 60 are selected such that, when the elongated sheet is formed into a roll having a predetermined inner peripheral dimension and a predetermined outer peripheral dimension, the transverse wave pattern will never be directly superimposed upon itself. The transverse waves, for instance, are angled to the direction of roll-up 64 at an angle in the range between about 91° and about 94°, and the preferred angle shown being approximately 92°, such as 91°57′. In the embodiment using such angulation, the wave length of the transverse waves should be in the range of between about 1.2 centimeters and about 10.2 centimeters, with a preferred wave length being about 1.9 centimeters and a preferred wave amplitude being about 0.8 millimeters.

As also indicated in FIG. 1, the predetermined regular wave pattern also may include hollow protrusions 54, 58 arranged in a series of continuous undulating longitudinal waves 70 having axes generally parallel with the direction 64 of roll-up of the elongated sheet. The wave length of the longitudinal waves is selected such that, when the elongated sheet is formed into a roll having a predetermined inner peripheral dimension and a predetermined outer peripheral dimension, the longitudinal wave pattern will never be directly superimposed upon itself. The wave length of the longitudinal waves 70 is in the range between about 1.2 centimeters and about 18.6 centimeters, with a preferred wave length being about 1.9 centimeters and a preferred wave amplitude being about 0.8 millimeters.

In the illustrated embodiment, the longitudinal wave pattern 70 is angled slightly to the direction of roll-up 64, in the same manner as the transverse wave pattern 60 is not perpendicular to the direction of roll-up. This is not a requirement of the present invention, however, when the longitudinal wave pattern is utilized exclusively without a transverse wave pattern, in which case the longitudinal wave pattern 70 may be angled to the direction of roll-up, as shown, or may be parallel with the direction of roll-up. In either case, the wave length of the longitudinal wave pattern may be significantly longer, such as closer to about 18.6 centimeters.

In the preferred embodiment, with respect to either the hollow protrusions arranged in angled transverse wave patterns, or in longitudinal wave patterns, or in a combination thereof, the spacing between the respective waves may vary, but a preferred wave spacing is about 1.6 millimeters.

The foregoing length and amplitude dimensions of the longitudinal waves, and the transverse waves which are angled to the direction of roll-up, have been calculated such that, when the elongated sheet is formed into a roll having a predetermined inner peripheral dimension and a predetermined outer peripheral dimension, neither wave pattern will ever be directly superimposed upon itself. To accomplish this, the foregoing dimensions contemplate peripheral dimensions wherein the sheet is rolled up in cylindrical fashion, and the inner circumferential dimension defined by the inner core member 12 is about 22.9 centimeters, the outer circumferential dimension defined by the outer casing 38, 40 is about 32.4 centimeters, and the effective thickness 33 of the sheet of support material, that is the space between the support surface 32 on one side and the support surface 34 on the other side, is in the range between about 0.5 millimeters and about 4.8 millimeters, and preferably about 1.1 millimeters. Different inner and/or outer peripheral dimensions, and/or a different effective thickness of the support material, will of course dictate the use of correspondingly different wave pattern dimensions to achieve the non-interdigitating benefits of the present invention.

Figure 5:
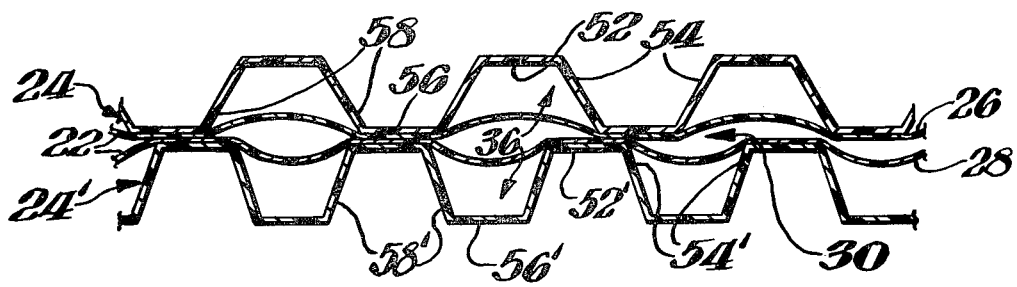
FIG. 5 is a sectional view enlarged similarly to FIG. 4 showing how the opposed embossments support adjacent sections of membrane; and, FIG. 6 is a perspective view, with parts broken away, showing the support material of this invention as it may be employed in a dialyzer coil for use in artificial kidney machines.

With particular reference to FIG. 5, which illustrates the basic operational interrelationship of the elements of this invention, the first section 26 of membrane 22 and the second section 28 of membrane 22 are positioned in close opposition to each other to provide between their inner faces a passage 30 for blood. The first support surface 32' is positioned adjacent the first section 28 of membrane, and the second support surface 34 is positioned adjacent the second section 26 of membrane, to define the passage 30 for the blood between the inner faces of the sections of membrane, and also to provide passage 36 for dialysate against the outer faces of the membrane and around the embossments 54', 58 respectively. The summits 52' of the embossments 54 engage the outer face of the first section 28 of membrane, and the summits 56 of the embossments 58 engage the outer face of the second section 26 of membrane to produce contact between the first and second sections of membrane at spaced intervals within the blood passage 30. The embossments are arranged in regular wave patterns, as described above, which produce such contact at spaced intervals, which are considerably greater than the lateral spacing 52a between immediately adjacent individual embossments, for controlling the average thickness dimension of the blood passage 30.

Reference to the above identified publications is recommended for a more complete understanding of the scope and content of the relevant art, and thus a better appreciation of the merits of the present invention.

While the above described embodiment constitutes the presently preferred mode of practicing this invention, other embodiments and equivalents are fairly included within the scope of the basic inventive concept, which is claimed as:

1. Membrane support means for use in a mass transfer device of the type having first and second sections of flexible membrane positioned to provide between their inner faces a flattened passage for one fluid with membrane support means contacting the outer faces of the membrane to define the passage for the one fluid and also to provide passage for another fluid to wash against the outer faces of the sections of membrane, the membrane support means consisting of a continuous sheet of contoured, substantially uniform thickness material sufficiently rigid to provide spaced apart generally parallel membrane support surfaces, one on each side of the sheet, the support surface on one side being defined by a series of spaced apart summits of hollow protrusions extending outwardly toward the one support surface and the support surface on the other side being defined by another series of spaced apart summits of hollow protrusions extending outwardly toward the other support surface, the spacing apart between the summits which define the support surface on one side being sufficiently small with respect to the space between the two support surfaces to insure that under operating pressures the membrane contacts only the summits and does not flex inwardly between the summits toward the support surface on the other side to the extent that passage for the other fluid becomes occluded, the membrane support means being characterized in that the summits which define the support surface on one side of the sheet are arranged with respect to each other, and also with respect to the summits which define the support surface on the other side of the sheet, in a predetermined pattern dimensioned and arranged such that, when an elongated length of the sheet is formed into a roll having a predetermined inner peripheral dimension and a predetermined outer peripheral dimension, the pattern will never be directly superimposed upon itself thereby avoiding the tendency of corresponding hollow protrusions to interdigitate.

2. Membrane support means as in claim 1 wherein the predetermined pattern is a regular wave pattern which includes summits arranged in a series of continuous undulating transverse waves having axes generally transverse to the direction of roll-up of the elongated sheet, and the axes of the transverse waves are angled to the direction of roll-up at an angle selected such that, when the elongated sheet is formed into a roll having a predetermined inner peripheral dimension and a predetermined outer peripheral dimension, the wave pattern will never be directly superimposed upon itself.

3. Membrane support means as in claim 1 wherein the predetermined pattern is a regular wave pattern which includes summits arranged in a series of continuous undulating longitudinal waves having axes generally parallel with the direction of roll-up of the elongated sheet, and the wave length of the longitudinal waves is selected such that, when the elongated sheet is formed into a roll having a predetermined inner peripheral dimension and a predetermined outer peripheral dimension, the wave pattern will never be directly superimposed upon itself.

4. Membrane support means as in claim 1 wherein an elongated length of the sheet is formed into a roll, having predetermined inner and outer circumferential dimensions, together with first and second sections of flexible membrane positioned thereagainst, to form a coil type dialyzer for use with artificial kidney machines, the predetermined pattern being a regular wave pattern dimensioned and arranged such that it will never be directly superimposed upon itself along any radial line of the coil.

5. A coil type dialyzer as in claim 4 wherein the flattened passage for the one fluid is relatively long and spirally directed and essentially linear in cross-section, means are provided for connecting each end of the spiral passage with tubing for communication with the circulatory system of a patient, passage for the other fluid is relatively short and axially directed and spiral in cross-section, and means are provided for connecting each end of the axial passage with the dialysis system of an artificial kidney machine.

6. A coil type dialyzer as in claim 5 wherein the predetermined regular wave pattern includes summits arranged in a series of continuous undulating transverse waves having axes generally transverse to the direction of roll-up of the elongated sheet, and the axes of the transverse waves are angled to the direction of roll-up at an angle selected such that the transverse waves of the wave pattern will never be directly superimposed.

7. A coil type dialyzer as in claim 6 wherein the regular wave pattern further includes summits arranged in a series of continuous undulating longitudinal waves having axes perpendicular to the axes of the transverse waves, and the wave length of the longitudinal waves is selected such that the longitudinal waves of the wave pattern will never be directly superimposed.

8. A coil type dialyzer as in claim 7 wherein the first and second sections of flexible membrane take the form of a flattened tube rolled up together with the elongated sheet, the sheet of support material is thermo-formed of plastic and is radially impervious to dialysate, and the hollow protrusions extending outwardly toward the one support surface of the sheet are dimensionally equal with the hollow protrusions extending outwardly toward the other support surface of the sheet.

9. A coil type dialyzer as in claim 8 wherein the wave length of the transverse waves is in the range between about 1.2 centimeters and about 10.2 centimeters and the axes of the transverse waves are angled to the direction of roll-up at an angle in the range between about 91° and about 94°, and the wave length of the longitudinal waves is in the range between about 1.2 centimeters and about 18.6 centimeters.

10. A coil type dialyzer as in claim 9 wherein the inner circumferential dimension is about 22.9 centimeters, the outer circumferential dimension is about 32.4 centimeters, and the space between the two support surfaces on each side of the sheet is in the range between about 0.5 millimeters and about 4.8 millimeters.

* * * * *